US010799828B2

(12) United States Patent
Postgate et al.

(10) Patent No.: US 10,799,828 B2
(45) Date of Patent: Oct. 13, 2020

(54) HARD INTERFACE DYNAMIC SEALS

(71) Applicant: Carrier Corporation, Farmington, CT (US)

(72) Inventors: Farley William Postgate, Syracuse, NY (US); Alexander Lifson, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 580 days.

(21) Appl. No.: 15/115,578

(22) PCT Filed: Jan. 8, 2015

(86) PCT No.: PCT/US2015/010571
§ 371 (c)(1),
(2) Date: Jul. 29, 2016

(87) PCT Pub. No.: WO2015/119736
PCT Pub. Date: Aug. 13, 2015

(65) Prior Publication Data
US 2017/0165602 A1 Jun. 15, 2017

Related U.S. Application Data

(60) Provisional application No. 61/935,638, filed on Feb. 4, 2014.

(51) Int. Cl.
*B01D 53/06* (2006.01)
*F16J 15/34* (2006.01)
(Continued)

(52) U.S. Cl.
CPC ............. *B01D 53/06* (2013.01); *B65D 81/26* (2013.01); *F16C 33/80* (2013.01); *F16J 15/34* (2013.01);
(Continued)

(58) Field of Classification Search
None
See application file for complete search history.

(56) References Cited

U.S. PATENT DOCUMENTS 3,780,498 A 12/1973 Wenner
3,844,725 A 10/1974 Nenicka
(Continued)

FOREIGN PATENT DOCUMENTS

CN 202015690 U 10/2011
EP 0693307 A1 1/1996
(Continued)

OTHER PUBLICATIONS

Chinese Office Action dated Aug. 16, 2018, issued during the prosecution of corresponding Chinese Patent Application No. CN 201580007328.9 (5 pages).

(Continued)

Primary Examiner — Christopher P Jones
Assistant Examiner — Phillip Y Shao
(74) Attorney, Agent, or Firm — Locke Lord LLP; Joshua L. Jones; Scott D. Wofsy

(57) ABSTRACT

A seal member (80) for a rotary regenerative scrubber (10) includes a hub (30), a rim (48) circumferentially surrounding the hub, and a plurality of spokes (86) extending from the hub to the rim. The hub, rim, and spokes define an axially facing seal face (88) configured to form a sealing engagement with an opposed seal surface of a rotary regenerative scrubber, and a mounting face (90) axially opposed to the seal face configured for mounting to a rotor assembly (20) of a rotary regenerative scrubber. The seal face includes a labyrinth seal (92) defined therein.

12 Claims, 6 Drawing Sheets

(51) Int. Cl.
  *B65D 81/26* (2006.01)
  *F16C 33/80* (2006.01)

(52) U.S. Cl.
  CPC ..... *F16J 15/3416* (2013.01); *B01D 2253/102* (2013.01); *B01D 2253/108* (2013.01); *B01D 2257/504* (2013.01); *B01D 2258/06* (2013.01); *B01D 2259/40086* (2013.01); *B01D 2259/4566* (2013.01); *Y02C 10/08* (2013.01)

(56) References Cited

U.S. PATENT DOCUMENTS

| | | | | |
|---|---|---|---|---|
| 4,199,154 | A * | 4/1980 | Mueller | F16J 15/40 |
| | | | | 277/420 |
| 5,025,917 | A * | 6/1991 | Smith | B65G 39/09 |
| | | | | 198/842 |
| 5,573,563 | A * | 11/1996 | Odom | B01D 46/12 |
| | | | | 55/301 |
| 5,702,508 | A * | 12/1997 | Moratalla | B01D 53/06 |
| | | | | 55/523 |
| 5,810,895 | A | 9/1998 | Staehle et al. | |
| 6,682,077 | B1 * | 1/2004 | Letourneau | F01D 1/36 |
| | | | | 277/409 |
| 6,783,738 | B1 * | 8/2004 | Sasaki | B01D 53/06 |
| | | | | 422/171 |
| 8,376,368 | B2 * | 2/2013 | Skorucak | F16J 15/4472 |
| | | | | 277/412 |
| 2001/0026110 | A1 * | 10/2001 | Kurosawa | B01D 53/06 |
| | | | | 310/261.1 |
| 2002/0071979 | A1 * | 6/2002 | DuBose | B01D 53/06 |
| | | | | 96/125 |
| 2005/0211099 | A1 * | 9/2005 | Doughty | A61L 9/014 |
| | | | | 96/108 |
| 2014/0137598 | A1 * | 5/2014 | Fleming, Jr. | A23L 3/3418 |
| | | | | 62/617 |

FOREIGN PATENT DOCUMENTS

| | | |
|---|---|---|
| GB | 1440 | 3/1897 |
| WO | WO-2013141891 A1 | 9/2013 |

OTHER PUBLICATIONS

The International Search Report and The Written Opinion of the International Searching Authority for International Application No. PCT/US2015/010571 dated Apr. 10, 2015.

* cited by examiner

HARD INTERFACE DYNAMIC SEALS

CROSS-REFERENCE TO RELATED APPLICATIONS

This application is the national phase under 35 U.S.C. § 371 of PCT International Application No. PCT/US2015/010571, filed Jan. 8, 2015, which claims the benefit of and priority to U.S. Provisional Patent Application No. 61/935,638 filed Feb. 4, 2014, and the contents of which are incorporated herein by reference in their entirety.

BACKGROUND OF THE INVENTION

1. Field of the Invention

The present disclosure relates to seals, and more particularly to seals for sealing against leakage between two gas flows passing through a rotating regenerative scrubber.

2. Description of Related Art

Perishable goods are commonly transported in a controlled environment within an enclosed space such as a cargo box of a truck, trailer, sea container, or intermodal container. Perishable produce, such as fresh fruits, vegetables and flowers, produce carbon dioxide as a product of the respiration process. In a closed environment, due to post harvest respiration, the carbon dioxide concentration rises and the oxygen concentration drops in the atmosphere within the closed environment. If the oxygen concentration gets too low or the carbon dioxide concentration gets too high, the produce can spoil. Additionally, fruits, vegetables and flowers release ethylene and/or ethylene compounds as a byproduct of the ripening process. The presence of ethylene based gases within the enclosed space of the cargo box will initiate the ripening process.

It is known that activated carbon can be used to filter carbon dioxide produced by respiring produce. If the activated carbon is not regenerated, the adsorbent becomes saturated and becomes ineffective. In applications such as stationary storage facilities, large drums full of the activated carbon are used to filter carbon dioxide. When the activated carbon in the drums becomes saturated, it can be replaced and/or regenerated. In stationary applications there is space for large amounts of the adsorbent and a plumbing system with control valves for switching between regeneration and filter modes of operation. Due to size constraints, among other things, these traditional regeneration processes are not conducive to mobile applications, such as cargo boxes, trailers, sea containers, and the like.

Such conventional methods and systems have generally been considered satisfactory for their intended purpose. However, there is still a need in the art for improved systems for scrubbing unwanted gases, for example gases known to accelerate ripening, from mobile container environments. This disclosure provides a solution to this need.

SUMMARY OF THE INVENTION

A seal member for a rotary regenerative scrubber includes a hub, a rim circumferentially surrounding the hub, and a plurality of spokes extending from the hub to the rim. The hub, rim, and spokes define an axially facing seal face configured to form a sealing engagement with an opposed seal surface of a rotary regenerative scrubber, and a mounting face axially opposed to the seal face configured for mounting to a rotor assembly of a rotary regenerative scrubber. The seal face includes a labyrinth seal defined therein.

The seal member can include a screen. The screen can span passages between the spokes, and can be configured to allow a gas flow therethrough and to retain a regenerative absorbent material from passing therethrough. The screen can include a stainless steel material, and the hub, rim, and spokes can include a self-lubricating polymer material.

The labyrinth seal can include a plurality of interior ridges defining troughs therebetween in the seal face, and opposed edge ridges bounding the seal face peripherally. The edge ridges can have a greater thickness than the interior ridges in a lateral direction normal to the interior and edge ridges.

Each spoke can include a spoke portion of the labyrinth seal with troughs extending radially defined in the seal face. The hub can include a hub portion of the labyrinth seal with troughs defined in the seal face extending circumferentially around the hub. A plurality of radially extending ridges can be included, each ridge interrupting the troughs in the hub portion of the labyrinth seal, with a circumferential segment of hub troughs defined between each circumferentially adjacent pair of ridges.

It is also contemplated that the rim can include a rim portion of the labyrinth seal with troughs defined in the seal face extending circumferentially around the rim. A plurality of radially extending ridges can be included, each ridge interrupting the troughs in the rim portion of the labyrinth seal, with a circumferential segment of rim troughs defined between each circumferentially adjacent pair of ridges.

In another aspect, a plurality of circumferentially extending ridges can be included, each separating a portion of the labyrinth seal defined in the rim from a portion of the labyrinth seal defined in a respective one of the spokes. It is also contemplated that a plurality of circumferentially extending ridges can be included, each separating a portion of the labyrinth seal defined in the hub from a portion of the labyrinth seal defined in a respective one of the spokes.

The mounting face can define a grove. The rim can include a rim portion of the groove, each spoke can include a spoke portion of the groove, and the hub can include a hub portion of the groove. The groove can be configured to engage an end face of a rotor wherein the end face of the rotor has a smaller area than the seal face.

A rotary regenerative scrubber is configured for removing a selected gaseous component from a flow of gas to be cleaned. The scrubber includes a housing defining a first flow passage for a flow of gas to be cleaned and a second flow passage for a flow of regenerating gas. A rotor assembly is disposed in the housing for rotation through the first flow passage and the second flow passage. The rotor assembly carries a regenerative absorbent material capable of absorbing the selected gaseous component. A first plate seal is disposed between a first seal seat of the housing and the rotor assembly. A second plate seal is disposed between a second seal seat of the housing and the rotor assembly. A first seal member as described above is connected for common rotation to a first end of the rotor assembly and a second seal member, also as described above, is connected for common rotation to an opposed second end of the rotor assembly. The seal face of each of the first and second seal members is in sealing engagement with an opposed one of the first and second plate seals, respectively. The mounting faces of the first and second seal members are connected to the rotor assembly.

The rotor assembly can include a rotor mounted to a shaft for rotation with the shaft, the rotor having a central hub, a circumferential wall, and a plurality of radially directed partitions extending from the central hub to the circumferential wall. The rim of each of the first and second seal members can be mounted to a respective end of the circumferential wall, wherein the hub of each of the first and second seal members is mounted to a respective end of the central hub of the rotor assembly, and wherein each of the spokes of the first and second seal members is mounted to a respective end of a respective radially directed partition of the rotor assembly.

It is also contemplated that the housing can include a first housing section and a second housing section. The first housing section can define a first gas manifold section and the second housing section can define a second gas manifold section. The first seal seat can be disposed across the first gas manifold and the second seal seat can be disposed across the second gas manifold. The first and second plate seals can seal with the first and second seal members, respectively, to seal the first flow passage between the first and second gas manifold sections from the second flow passage between the first and second gas manifold sections.

In accordance with another aspect, a seal gap can be defined between the first seal member and the first plate seal, wherein a seal gap is defined between the second seal member and the second plate seal. The seal gaps can be about 0.015 inches (0.381 mm) deep and can originate from the manufacturing tolerances specified for the flatness of the seal member and the plate seals, which can be aluminum seal plates for example.

Each of the first and second seal members can form a hard interface dynamic seal wherein the seal face of each of the first and second seal members is in direct physical contact with a respective one of the first and second plate seals. The seal faces of the first and second seal members can include a self-lubricating polymer material, and the first and second plate seals include aluminum in in direct physical contact with the self-lubricating polymer material of the first and second seal members, respectively.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
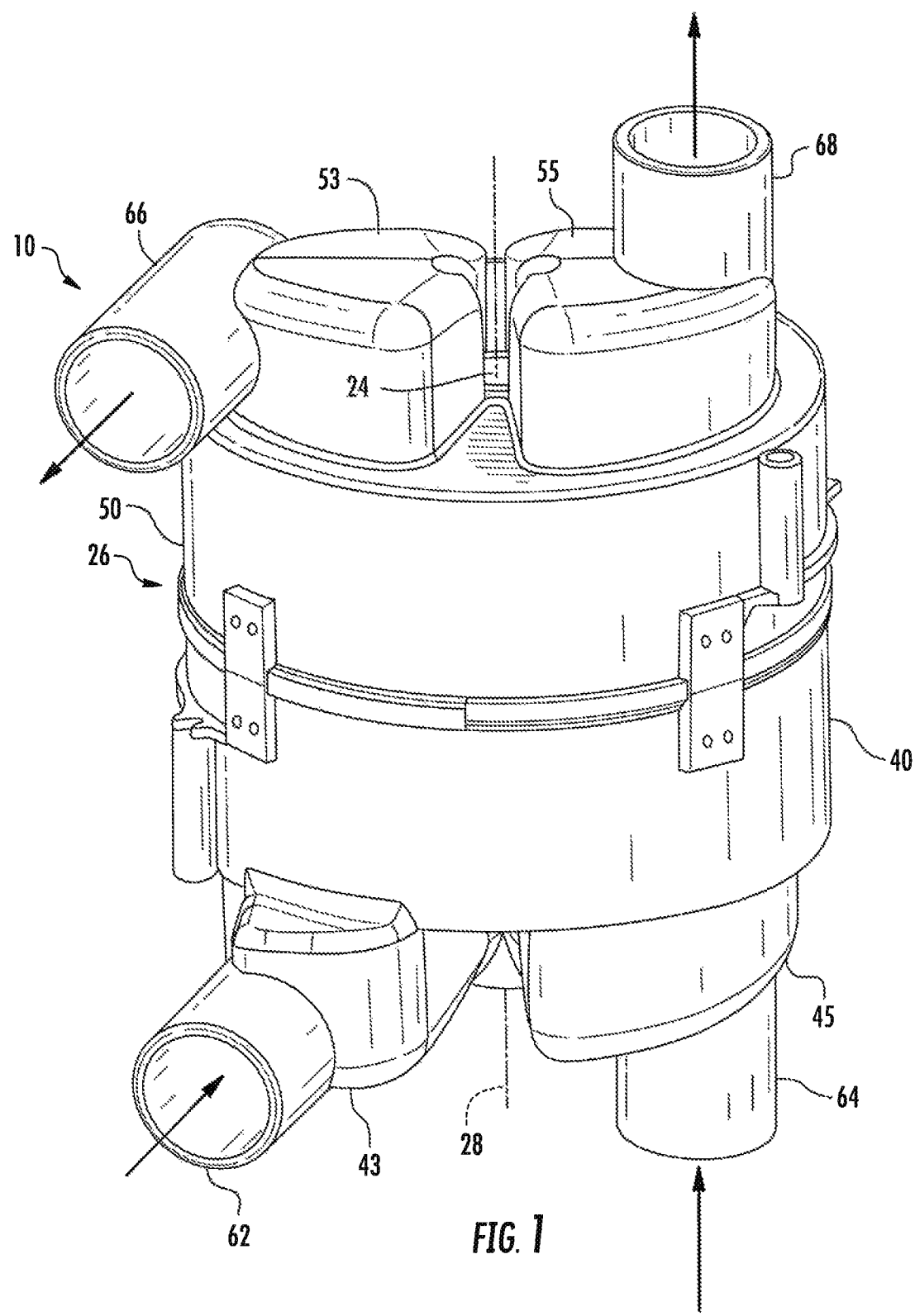
FIG. 1 is a perspective view of an exemplary embodiment of a rotary regenerative scrubber constructed in accordance with the present disclosure, showing the inlets and outlets for gas to be cleaned and regeneration gas.

Reference will now be made to the drawings wherein like reference numerals identify similar structural features or aspects of the subject disclosure. For purposes of explanation and illustration, and not limitation, a partial view of an exemplary embodiment of a rotary regenerative scrubber in accordance with the disclosure is shown in FIG. 1 and is designated generally by reference character 10. Other embodiments of rotary regenerative scrubbers in accordance with the disclosure, or aspects thereof, are provided in FIGS. 2-6, as will be described. The systems and methods described herein can be used for scrubbing gas and regenerating the filter material in order to increase the scrubbing capacity of gas scrubbers.

Activated carbon can be used to filter carbon dioxide produced by respirating produce. If the activated carbon is not regenerated, the adsorbent becomes saturated and becomes ineffective. In applications such as stationary storage facilities, large drums full of the activated carbon are used to filter carbon dioxide. When the activated carbon in the drums becomes saturated, it can be replaced and/or potentially regenerated. In stationary applications there is space for large amounts of the adsorbent and a plumbing system with control valves for switching between regeneration and filter modes of operation. Due to size constraints, among other things, these traditional regeneration processes are not conducive to mobile applications, such as cargo boxes, trailers, sea containers, and the like.

In the case of mobile applications such as in refrigerated containers, the space available can be significantly limited. In order to use activated carbon technology in accordance with this disclosure, it was desirable to find a way to continuously regenerate activated carbon in a confined space such as in mobile containers and the like. This disclosure provides a solution that can allow the activated carbon adsorbant to be continuously regenerated without introducing extra oxygen into the container atmosphere. The sealing mechanisms disclosed herein allow scrubber systems to remove carbon dioxide continuously to regenerate the adsorbant while providing a seal that can keep regenerative fresh air from being introduced into the controlled atmosphere inside of a container.

Figure 2:
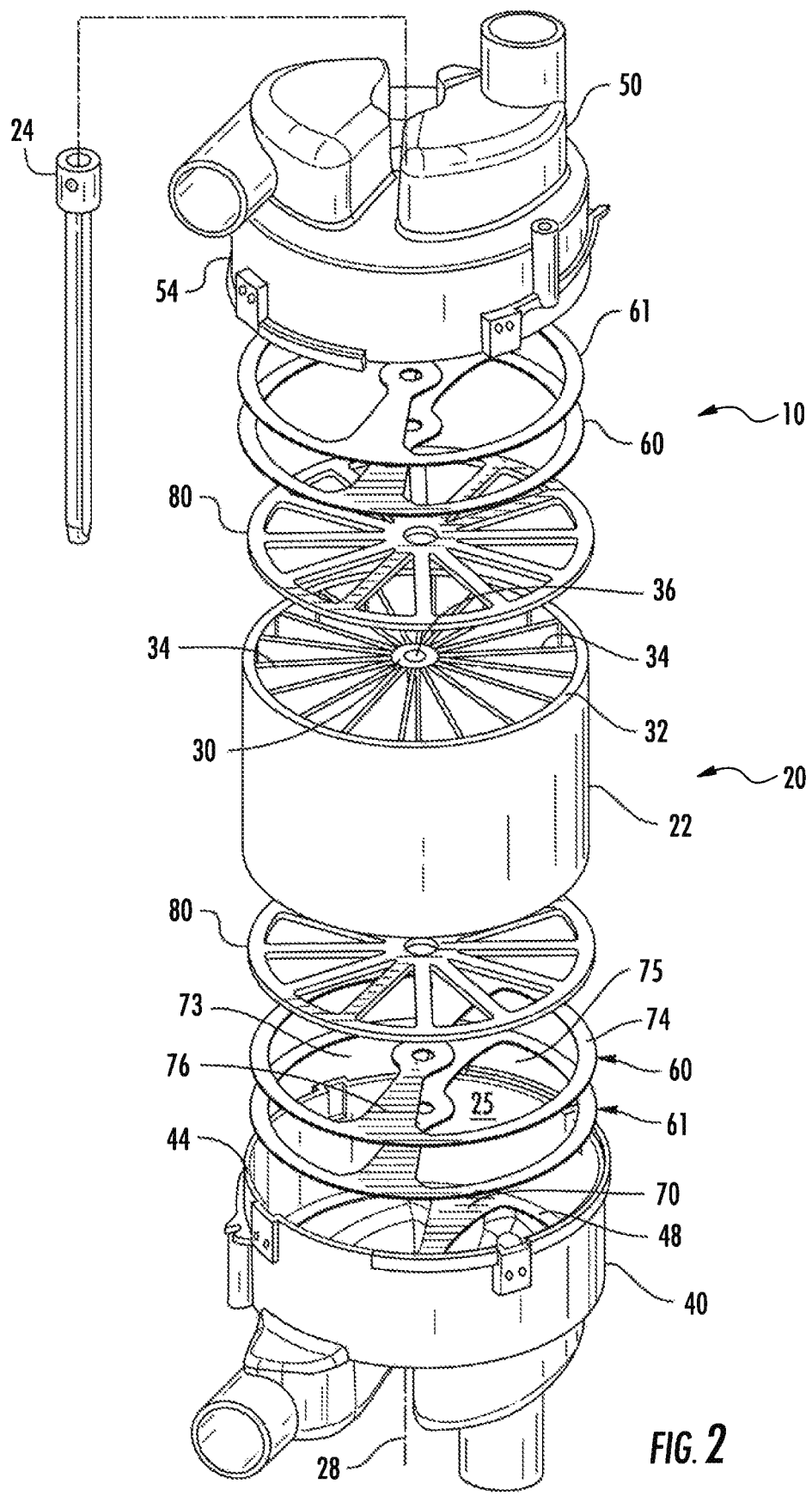
FIG. 2 is an exploded perspective view of the rotary regenerative scrubber of FIG. 1, showing the seal members and rotor assembly.

Referring initially to FIGS. 1 and 2 of the drawings, there is depicted an exemplary embodiment of a rotary regenerative scrubber 10 having a rotor assembly 20 that carries an absorbent material capable of absorbing a selected gaseous component or components from a flow of gas passing through the absorbent material. The rotor assembly 20 includes a rotor 22, also referred to as a carousel, mounted to a shaft 24. The rotor assembly 20 is disposed within a stationary housing 26 for rotation with the shaft 24 about a longitudinal axis 28 of the shaft 24.

The rotor 22 includes a central hub 30, a circumferential wall 32 and a plurality of radially directed partitions 34 extending from the hub 30 to the circumferential wall 32. The hub 30 has a central hole 36 extending axially therethrough for receiving the shaft 24 to which the rotor 22 is mounted for rotation with the shaft 24. The plurality of partitions 34 divide the volume defined by the rotor 22 into a plurality of wedge-shaped sectors 38 (identified in FIG. 5). Absorbent material capable of absorbing a selected gas component or components is disposed in each sector 38.

The housing 26 includes a first housing section 40 and a second housing section 50. In the depicted embodiment wherein the rotary regenerative scrubber 10 is shown as vertically orientated in FIG. 1, the first housing section 40 forms a lower housing and the second housing section 50 forms an upper housing. It is to be understood, however, that the rotary regenerative scrubber 10 may be orientated for rotation about an axis other than a vertical axis, such as a horizontal axis or otherwise orientated axis, as desired.

Each of the first and second housing sections 40, 50 defines a gas manifold section 42, 52 (identified in FIG. 6) and a chamber wall 44, 54. When the first and second housing sections 40, 50 are assembled in mating relationship as depicted in FIG. 1, the respective chamber walls 44, 54 come together to define a chamber 25 (identified in FIG. 2) in which the rotor 22 is disposed.

Each of the gas manifold sections 42, 52 (identified in FIG. 6) includes separate first and second plenums, the first plenums 43, 53 for the generative gas and the second plenums 45, 55 for the gas to be cleaned. When the first and second housing sections 40 and 50 are assembled together, the first plenums 43, 53 are in fluid communication via a first gas flow passage through the chamber 25 in which the rotor 22 is disposed. Similarly, the second plenums 45, 55 are in fluid communication via a second gas flow passage through the chamber 25. The first housing section 40 further includes a connector 62 opening in fluid communication with the first plenum 43 and a second connector 64 opening in fluid communication with the second plenum 45. The second housing section 50 further includes a connector 66 opening in fluid communication with the first plenum 53 and a second connector 68 opening in fluid communication with the second plenum 55.

One of the second plenums 45, 55 serves as an inlet plenum for receiving a flow of gas to be cleaned and the other of the second plenums 45, 55 serves as an outlet plenum through which a flow cleaned gas is discharged. One of the first plenums 43, 53 serves as an inlet plenum for receiving a flow of regenerative gas and the other of the first plenums 43, 53 serves as an outlet plenum through which the regenerative gas is discharged. In the embodiment depicted in FIG. 1, the first plenum 43 of the first housing section 40 is an inlet plenum receiving the flow of regenerative gas through connector tube 62, the second plenum 45 of the first housing section 40 is an inlet plenum receiving the flow of gas to be cleaned through connector tube 64, the first plenum 53 of the second housing section 50 is an outlet plenum through which the flow of regenerative gas discharges through the connector 66, and the second plenum 55 of the second housing section 50 is an outlet plenum through which the flow of the cleaned gas discharges through connector 68.

With reference to FIG. 2, as the flow of gas to be cleaned and the flow of regenerative gas pass through the rotor 22 simultaneously along parallel flow paths, either in concurrent or counter current flows, it is desirable to minimize the leakage of gas to be cleaned into the regenerative gas flow or of regenerative gas into the flow of gas to be cleaned. To reduce or eliminate such gas leakage, a sealing arrangement is provided at each of the interfaces between the respective end faces of the rotor 22 with the first housing section 40 and the second housing section 50. In the depicted embodiment, at each end of the rotor 22, the sealing arrangement includes a plate seal 60 disposed between a seal member 80 attached at the end face of the rotor 22 and an interfacing surface of the respective first and second housing sections 40 and 50. A flexible gasket 61 is disposed between each of the plate seals 60 and the respective one of the first and second housing sections 40 and 50.

The first housing section 40 includes a seal seat that includes an annular rim 48 circumscribing an open area and a diametrically extending central member 70 spanning the open area from one side of the rim 48 to a diametrically opposite side of the rim 48. The diametrically extending central member 70 bisects the open area circumscribed by the rim 48 into a first opening on one side of the central member 70 coincident with the first plenum 43 and a second opening on the opposite side of the central member 70 coincident with the second plenum 45. Second housing section 50 includes a similar seal seat to that described above for first housing section 40, see., e.g., central member 70 of second housing section 50 as identified in FIG. 6.

Each plate seal 60 has an outer annular ring 74 circumscribing an open area and a diametrically extending member 76 spanning the open area, thereby dividing the open area into a first opening 73 and a second opening 75. As shown in Cross-section in FIG. 6, A plate seal 60 is installed in each of the first and second housing sections 40 and 50. A first plate seal 60 is disposed between the gas manifold section 42 of the first housing section 40 and a first seal member 80 of the rotor 22. A second plate seal 60 is disposed between the gas manifold section 52 of the second housing section 50 and the a second seal member 80 of rotor 22. The first plate seal 60 may be generally commensurate in size and shaped to the seal seat of first housing section 40. The second plate seal 60 may be generally commensurate in size and shape to the seal seat of second housing section 50.

As depicted in FIG. 2, the first plate seal 60 is disposed in the first housing section 40 with member 76 in alignment with the central member 70. The second plate seal 60 is similarly aligned within second housing section 50. The first and second plate seals 60 are seated to be stationary relative to first and second housing members 40 and 50 as rotor 22 with seal members 80 rotate relative thereto. The first and second plate seals 60 seal with the first and second seal members 80, respectively, to seal the first gas flow passage between the first and second gas manifold sections 42, 52 from the second gas flow passage between the first and second gas manifold sections 42, 52.

Figure 3:
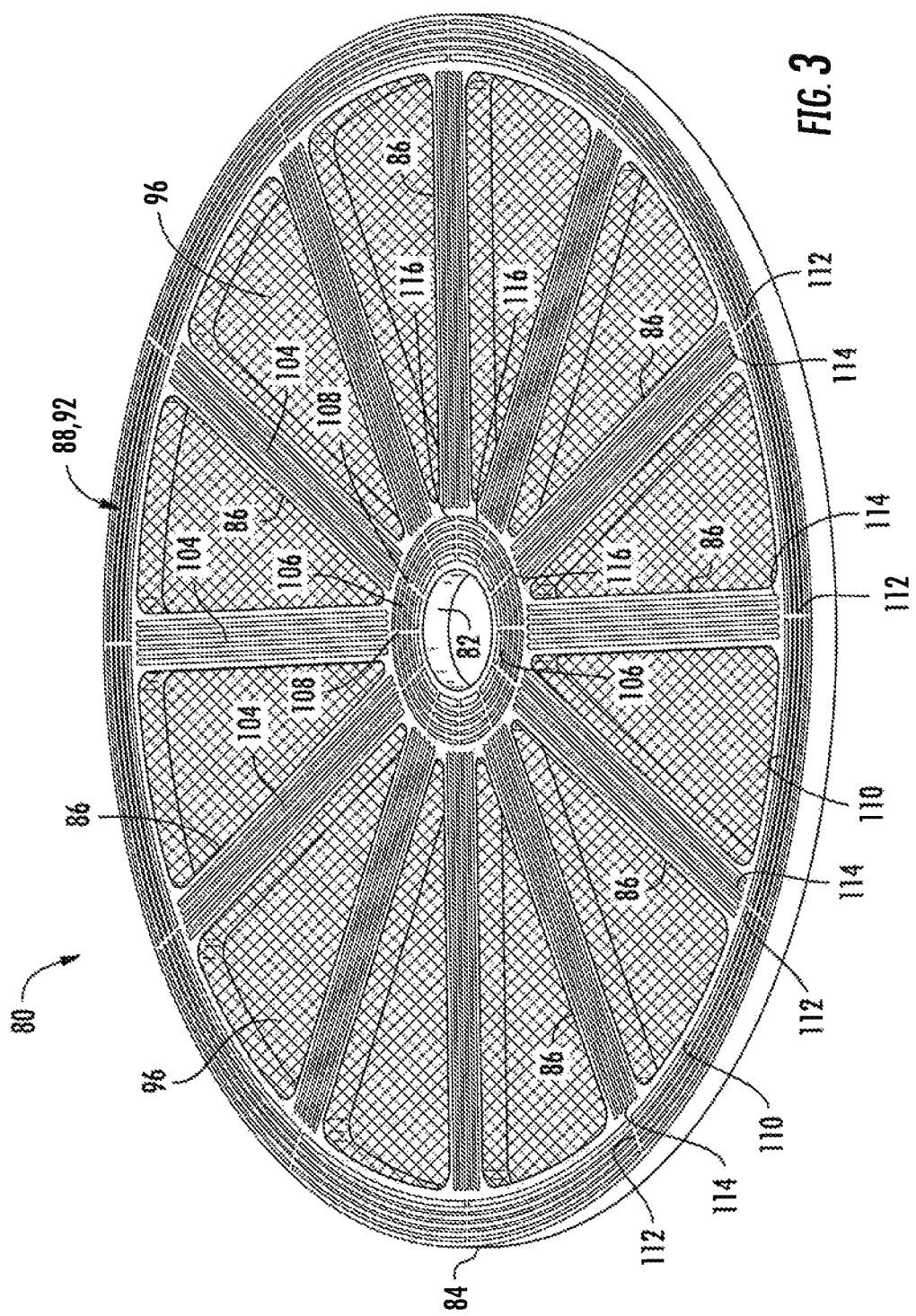
FIG. 3 is a perspective view of one of the seal members of FIG. 2, showing the labyrinth seal defined in the seal face.

With reference now to FIG. 3, each seal member 80 includes a hub 82, a rim 84 circumferentially surrounding the hub 82, and a plurality of spokes 86 extending from the hub 82 to the rim 84. The hub 82, rim 84, and spokes 86 define an axially facing seal face 88 configured to form a sealing engagement with an opposed seal surface, i.e., of plate seals 60 facing towards rotor 22. The seal face 88 includes a labyrinth seal 92 defined therein.

Figure 4:
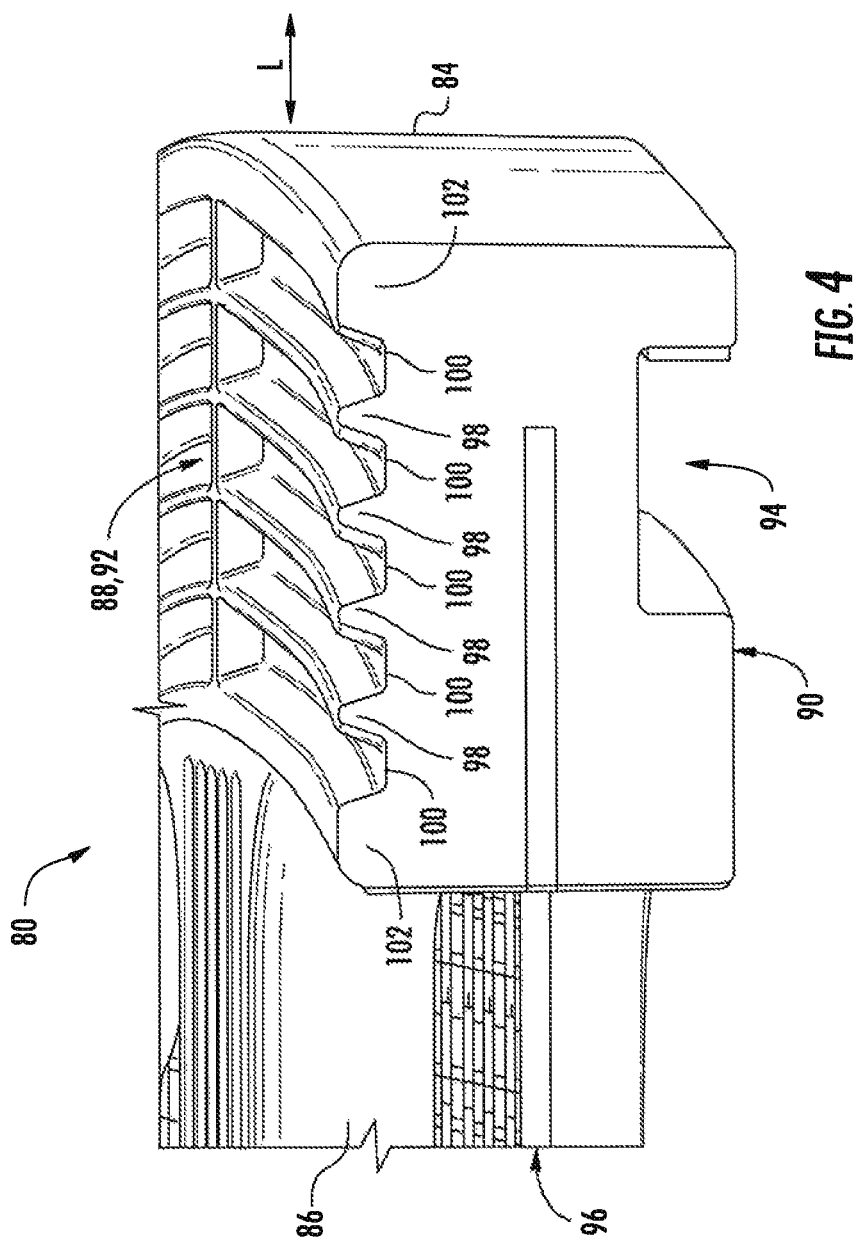
FIG. 4 is a cross-sectional perspective view of the seal member of FIG. 3, showing the ridges in the labyrinth seal.

Referring to FIG. 4, each seal member 80 includes a mounting face 90 axially opposed to the seal face 88 configured for mounting to rotor 22 of rotor assembly 20 shown in FIG. 2. Mounting face 90 defines a grove 94, also shown in FIG. 5, that is shaped as an imprint of the end face of rotor 22. A first seal member 80 is connected for common rotation to a first end of the rotor 22 and a second seal member 80 is connected for common rotation to an opposed second end of the rotor 22.

Figure 5:
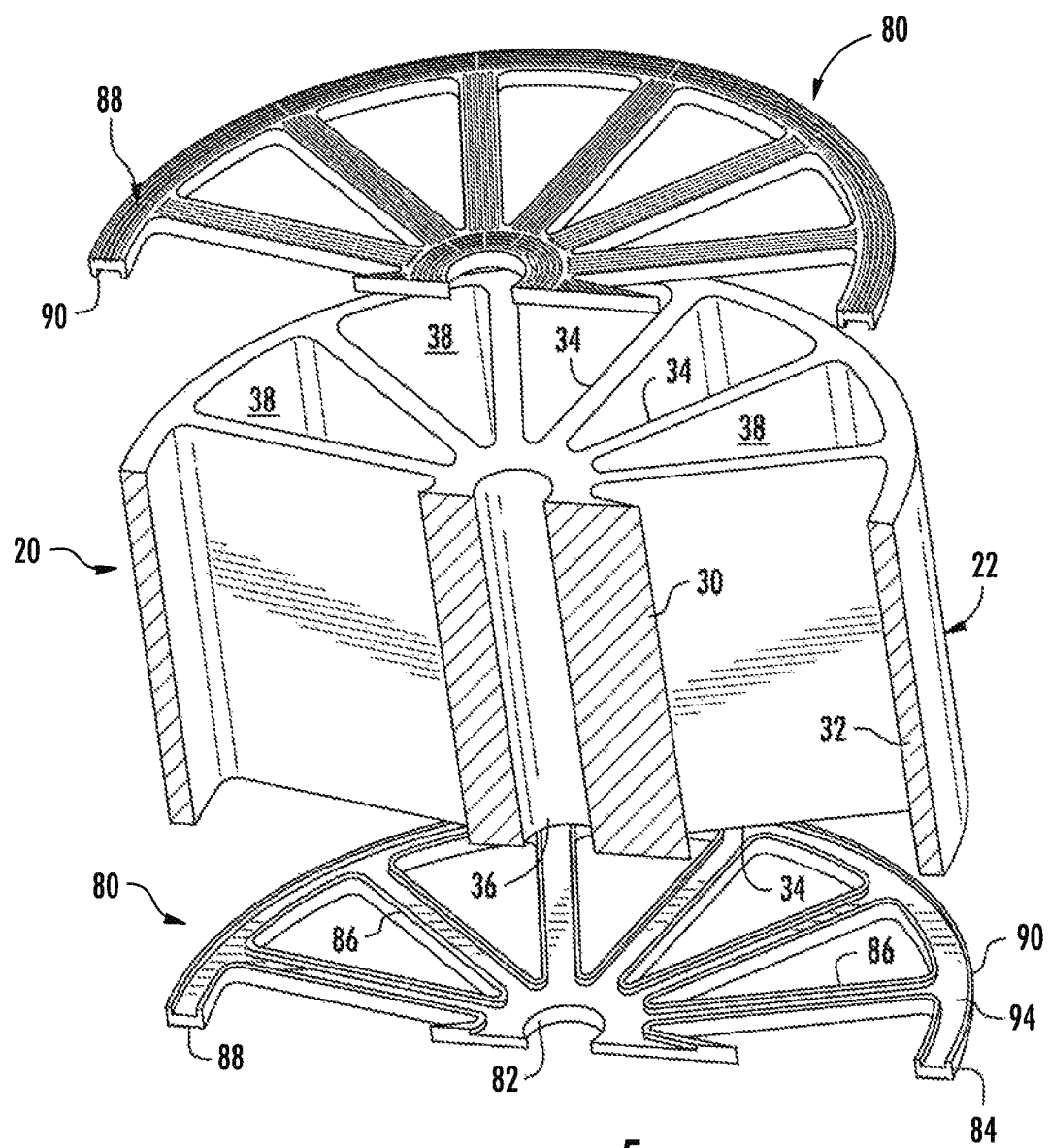
FIG. 5 is a cross-sectional perspective view of the rotor assembly of FIG. 2, showing the mounting face of one of the seal members.
Figure 6:
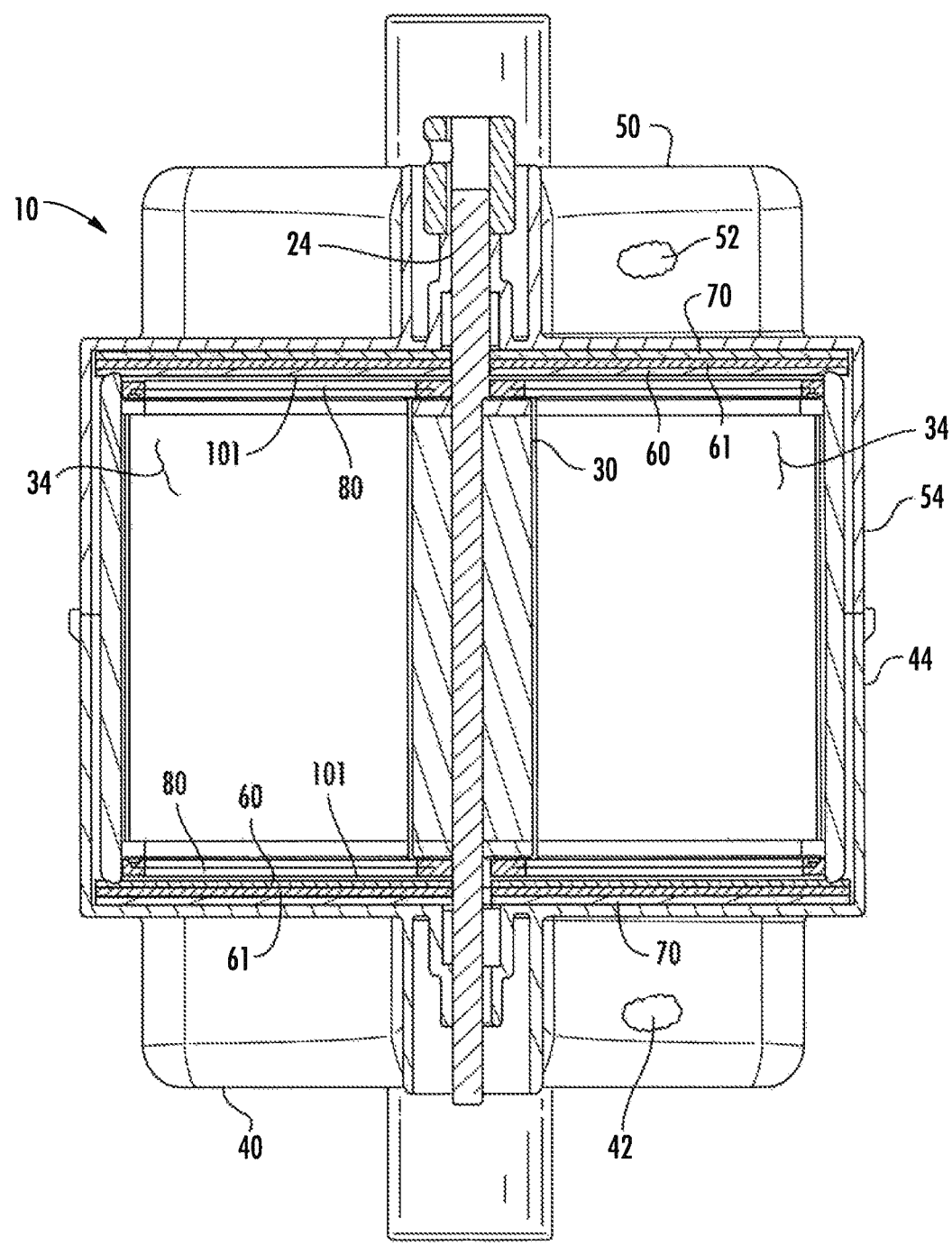
FIG. 6 is a cross-sectional side elevation view of the rotary regenerative scrubber of FIG. 1, showing the sealing engagement of the seal members and the respective plate seals.

With reference to FIG. 5, the rim 84 of each of the first and second seal members 80 includes a portion of groove 94 that can be mounted to a respective end face of the circumferential wall 32 of rotor 22. The hub 82 of each of the first and second seal members 80 includes a portion of groove 94 mounted to a respective end of the central hub 30 of the rotor assembly 20, e.g., by fixation with an epoxy adhesive in groove 94. Each of the spokes 86 of the first and second seal members 80 includes a portion of groove 94 that is mounted to a respective end of a respective radially directed partition 34 of the rotor assembly 20. Capping the ends of rotor 22 with seal members 80 provides a larger seal face area than would be provided by the end faces of rotor 22 alone, i.e., without having to increase the thickness of central hub 30, circumferential wall 32, or radially directed partitions 34. Therefore, the volume of wedge-shaped sectors 38 do not have to be reduced in order to increase the sealing area, meaning that the absorbent material contained therein need not be reduced to increase sealing area.

Each seal member 80 includes a screen 96. Screen 96 spans the passages between spokes 86 as shown in FIG. 3 (for sake of clarity, screen 96 is not shown in FIGS. 2 and 5). Screen 96 is configured to allow a gas flow therethrough and to retain the regenerative absorbent material from passing therethrough. Screen 96 can include a stainless steel material, and the hub, rim, and spokes can include a self-lubricating polymer material. For example, as shown in FIG. 4, screen 96 can extend into rim 84, and can be molded into rim 84 by injection molding rim 84, spokes 86, and hub 82 onto screen 96 for example.

The labyrinth seal formed between a polymer seal member 80 and an aluminum plate seal 60, for example, is a hard interface dynamic seal. The seal formed between seal member 80 and plate seal 60 is a contact seal. Traditional labyrinth seals generally have a gap specified between the sealing components, which do not make contact. In contrast, the seal interface between seal member 80 and plate seal 60 is hard (e.g., with aluminum in direct physical contact with a hard plastic). The movement of the seal member 80 relative to the plate seal 60 while in contact means the seal interface is a hard interface dynamic seal.

With further reference to FIG. 5, the rotor 22 of the rotary regenerative scrubber 10 carries a regenerative absorbent material capable of absorbing the selected gaseous component or components to be removed from the gas to be cleaned. A regenerative absorbent material is an absorbent material whose absorbent capacity may be restored by desorbing the absorbed gaseous component from the absorbent material. The absorbent material may be in any form and disposed in the rotor in any manner suitable to be carried in the wedge-shaped sectors 38 of the rotor 22. Screens 96 of the seal members 80 contain the absorbent material within sectors 38.

Referring to FIGS. 3 and 4, labyrinth seal 92 includes a plurality of interior ridges 98 defining troughs 100 therebetween in the seal face 88. Opposed edge ridges 102 bound the seal face 88 peripherally. The edge ridges 102 have a greater thickness than the interior ridges 98 in a lateral direction L normal to the interior and edge ridges 98 and 102. Edge ridges 102 have the same height above troughs 100 as interior ridges 98, and serve to provide a structure for the seal to ride on against plate seals 60, e.g., to protect the interior ridges 98. With the sealing area provided by seal members 80, as described above, there is adequate sealing area for five troughs 100 (identified in FIG. 4), described below. Each trough adds to the pressure drop required for fluid to leak through the seal. Those skilled in the art will readily appreciate that any other suitable number of troughs 100 can be included without departing from the scope of this disclosure.

In accordance with another aspect, the seal gaps 101 defined between each seal member 80 and the respective plate seal 60 are superficial and can be approximately 0.015 inches (0.381 mm) wide. Those skilled in the art will readily appreciate that these superficial gaps are derived from exemplary manufacturing flatness tolerances specified for the seal members 80 and plate seals 60, and that any other suitable manufacturing tolerances can be used for other materials and/or applications without departing from the scope of this disclosure. The gaps 101 are partial gaps due to this tolerance, meaning than in some places plate seals 60 contact their respective seal members 80, and in other places the gap 101 exists.

Each spoke 86 includes a spoke portion 104 of labyrinth seal 92 with troughs extending radially defined in the seal face 88. Hub 82 includes a hub portion 106 of the labyrinth seal 92 with troughs defined in the seal face 88 extending circumferentially around hub 82. A plurality of radially extending ridges 108 interrupts the troughs in the hub portion 106 of the labyrinth seal 92, with a circumferential segment of the hub troughs defined between each circumferentially adjacent pair of ridges 108. Rim 84 includes a rim portion 110 of the labyrinth seal with troughs defined in the seal face 88 extending circumferentially around the rim 84. A plurality of radially extending ridges 112 interrupt the troughs in the rim portion 110 of the labyrinth seal 92, with a circumferential segment of rim troughs defined between each circumferentially adjacent pair of ridges 112.

In another aspect, a plurality of circumferentially extending ridges 114 are included, each separating a portion of the labyrinth seal 92 defined in the rim 84 from a portion of the labyrinth seal 92 defined in a respective one of the spokes 86. A plurality of circumferentially extending ridges 116 are included, each separating a portion of the labyrinth seal 92 defined in the hub 82 from a portion of the labyrinth seal 92 defined in a respective one of the spokes 86. Ridges 108, 112, 114, and 116 are optional and serve to reduce or eliminate trough-wise flow in the labyrinth seal that could otherwise undermine the sealing efficacy of the labyrinth seal.

The rotary regenerative scrubber 10 disclosed herein is suitable for, but limited in application to, use in removing carbon dioxide from a flow of cargo box air drawn from the cargo box of a refrigerated transport container, such as a truck, a trailer, a sea-going container, or an intermodal container. Therefore, as an example, the operation of the rotary regenerative scrubber 10 will be described in application to removing carbon dioxide from air drawn from the cargo box of a container transporting a perishable product that emits carbon dioxide as a respiration by-product. In such applications, the absorbent material may comprise any carbon dioxide absorbent material that can be regenerated by contacting fresh air with the carbon dioxide absorbent material to desorbed absorbed carbon dioxide and carry the desorbed carbon dioxide away.

In operation of the rotary regenerative scrubber 10, as shown in FIGS. 1-2, with the rotor 22 carrying a regenerative carbon dioxide absorbent material, carbon dioxide bearing air drawn from the closed environment within a cargo box and passed through the connector 64 into the second plenum 45, from the plenum 45 through the second opening 75 in the first plate seal 60, thence through the rotor 22, through the second opening 75 in the second plate seal 60 into the second plenum 55 to discharge through the connector 68. Simultaneously, to regenerate the carbon dioxide absorbent material, fresh air is passed through the connector 62 into the first plenum 43, from the first plenum 43 through the first opening 73 in the first plate seal 60, thence through the rotor 22, through the first opening 73 in the second plate seal 60 into the second plenum 53 to discharge through the connector 66.

As the rotor 22 rotates within the chamber 25, the radially extending partitions 34 that divide the volume of the rotor 22 into the plurality of wedge-shaped sectors 38, and the corresponding spokes 86 of seal members 80, pass across the facing surface of each of the first and second plate seals 60 in sealing relationship those facing surfaces. Thus, a sealing arrangement is established at each end of the rotor 22 through the first and second plate seals 60 and seal members 80 disposed between the rotor end faces and the central members 70 of the first and second housing sections 40, 50. The sealing arrangement minimizes leakage of gas from one air flow passing through the rotor into the other air flow passing through the rotor 22. The radially extending partitions 34 may be spaced at circumferential intervals such that each wedge-shaped sector 38 subtends a sector angle that is smaller than the sector angles subtended by the radially extending portions of the plate seals 60 disposed against the central members 70 of the first and second housing sections 40, 50, respectively.

The terminology used herein is for the purpose of description, not limitation. Specific structural and functional details disclosed herein are not to be interpreted as limiting, but merely as basis for teaching one skilled in the art to employ the present disclosure. Those skilled in the art will also recognize the equivalents that may be substituted for elements described with reference to the exemplary embodiments disclosed herein without departing from the scope of the present disclosure. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A seal member for a rotary regenerative scrubber comprising:
    a hub;
    a rim circumferentially surrounding the hub; and
    a plurality of spokes extending from the hub to the rim, wherein the hub, rim, and spokes define an axially facing seal face configured to form a sealing engagement with an opposed seal surface of a rotary regenerative scrubber, and a mounting face axially opposed to the seal face configured for mounting to a rotor assembly of a rotary regenerative scrubber, wherein the seal face includes a labyrinth seal defined therein,
    wherein the labyrinth seal includes a plurality of interior ridges defining troughs therebetween in the seal face, and opposed edge ridges bounding the seal face peripherally, wherein the edge ridges have a greater thickness than the interior ridges in a lateral direction normal to the interior and edge ridges, wherein the edge ridges have the same height above the troughs as the interior ridges, wherein each trough has the same width.

2. A seal member as recited in claim 1, wherein each spoke includes a spoke portion of the labyrinth seal with troughs extending radially defined in the seal face.

3. A seal member as recited in claim 1, wherein the hub includes a hub portion of the labyrinth seal with troughs defined in the seal face extending circumferentially around the hub.

4. A seal member as recited in claim 3, further comprising a plurality of radially extending ridges, each ridge interrupting the troughs in the hub portion of the labyrinth seal, with a circumferential segment of hub troughs defined between each circumferentially adjacent pair of ridges.

5. A seal member as recited in claim 1, wherein the rim includes a rim portion of the labyrinth seal with troughs defined in the seal face extending circumferentially around the rim.

6. A seal member as recited in claim 5, further comprising a plurality of radially extending ridges, each ridge interrupting the troughs in the rim portion of the labyrinth seal, with a circumferential segment of rim troughs defined between each circumferentially adjacent pair of ridges.

7. A seal member as recited in claim 1, further comprising a plurality of circumferentially extending ridges, each separating a portion of the labyrinth seal defined in the rim from a portion of the labyrinth seal defined in a respective one of the spokes.

8. A seal member as recited in claim 1, further comprising a plurality of circumferentially extending ridges, each separating a portion of the labyrinth seal defined in the hub from a portion of the labyrinth seal defined in a respective one of the spokes.

9. A seal member as recited in claim 1, further comprising a screen, wherein the screen spans passages between the spokes, wherein the screen is configured to allow a gas flow therethrough and to retain a regenerative absorbent material from passing therethrough.

10. A seal member as recited in claim 9, wherein the screen includes a stainless steel material.

11. A seal member as recited in claim 1, wherein the hub, rim, and spokes include a self-lubricating polymer material.

12. A seal member as recited in claim 1, wherein the mounting face defines a grove, wherein the rim includes a rim portion of the groove, each spoke includes a spoke portion of the groove, and the hub includes a hub portion of the groove, and wherein the groove is configured to engage an end face of a rotor wherein the end face of the rotor has a smaller area than the seal face.

* * * * *